(12) United States Patent
Petrich

(10) Patent No.: US 7,653,219 B2
(45) Date of Patent: Jan. 26, 2010

(54) SYSTEM AND METHOD FOR IMAGE ATTRIBUTE RECORDING AN ANALYSIS FOR BIOMETRIC APPLICATIONS

(75) Inventor: David B. Petrich, Seattle, WA (US)

(73) Assignee: Photoinaphoto.Com, Bellevue, WA (US)

( * ) Notice: Subject to any disclaimer, the term of this patent is extended or adjusted under 35 U.S.C. 154(b) by 286 days.

(21) Appl. No.: 10/349,787

(22) Filed: Jan. 22, 2003

(65) Prior Publication Data

US 2003/0138134 A1 Jul. 24, 2003

Related U.S. Application Data

(60) Provisional application No. 60/351,341, filed on Jan. 22, 2002.

(51) Int. Cl.
*G06K 9/00* (2006.01)

(52) U.S. Cl. .................. 382/115; 382/118; 382/154

(58) Field of Classification Search .............. 382/118
See application file for complete search history.

(56) References Cited

U.S. PATENT DOCUMENTS

| | | | |
|---|---|---|---|
| 4,020,463 A * | 4/1977 | Himmel | 382/242 |
| 5,719,947 A * | 2/1998 | Enomoto et al. | 382/107 |
| 6,173,068 B1 * | 1/2001 | Prokoski | 382/115 |
| 6,181,806 B1 | 1/2001 | Kado et al. | 382/118 |
| 6,301,370 B1 | 10/2001 | Steffens et al. | 382/103 |
| 6,332,038 B1 | 12/2001 | Funayama et al. | 382/190 |
| 6,434,278 B1 * | 8/2002 | Hashimoto | 382/285 |
| 6,724,930 B1 * | 4/2004 | Kosaka et al. | 382/154 |
| 6,781,704 B2 * | 8/2004 | Dudkiewicz et al. | 356/603 |
| 2002/0023652 A1 * | 2/2002 | Riaziat et al. | 128/897 |
| 2002/0061130 A1 * | 5/2002 | Kirk et al. | 382/154 |

* cited by examiner

*Primary Examiner*—Bhavesh M Mehta
*Assistant Examiner*—Alex Liew
(74) *Attorney, Agent, or Firm*—Merchant & Gould, P.C.

(57) ABSTRACT

A system for recording and analyzing lighting attributes associated with a calibrated target device captured within an image to provide for enhanced object recognition within the captured image. A target device is used to provide lighting information relative to a subject within the image. The attributes allow the lighting conditions at the time of the image capture to be reconstructed. In addition, two or more target devices may be use to triangulate the position of a light source to any point within the captured image. Further, the lighting attributes may be used to create a contour mapping of the subject captured within the image.

20 Claims, 4 Drawing Sheets

SYSTEM AND METHOD FOR IMAGE ATTRIBUTE RECORDING AN ANALYSIS FOR BIOMETRIC APPLICATIONS

REFERENCE TO RELATED APPLICATIONS

The present application claims benefit under 35 U.S.C. §119(e) of U.S. Provisional Patent Application No. 60/351,341 filed Jan. 22, 2002.

FIELD OF THE INVENTION

The present invention relates to computer and photograph manipulation systems and machine vision technologies in general, and particularly to a scene illumination processing system in the field of digital imaging and biometrics for recording and analyzing photographic illumination data.

BACKGROUND OF THE INVENTION

Increased security concerns have brought photographic analysis to the forefront of technology concerns. Improved cameras and equipment for surveillance have been implemented in a variety of venues in an attempt to increase accuracy of images provided to security personnel. Each image represents a combination of attributes that are important to analysis of the image. These attributes may include lighting, camera angle, perspective, color, and the like.

The position and style of lighting are among the most important factors of capturing photographic images. The change in lighting may be the difference between a recognizable subject within an image or an unrecognizable subject. Photographic lighting is often described according to its position and intensity. Data may be recorded that provides a physical description of the lighting attributes of an image. The light sources may be described in terms of angular measurements, ambience, and/or degree of diffusion.

Certain software systems provide analysis of digitally captured photographic images. The photographic image is analyzed to determine a variety of attributes. One area of image analysis involves facial recognition software. When an image is taken of a person's face, the image is analyzed and compared with other photographic images of facial captures to determine if a match exists. Object recognition requires complex algorithms in order to recognize an object from a two-dimensional image. However, with new advances in software technologies, it is becoming possible to automatically scrutinize enormous amounts of data.

SUMMARY OF THE INVENTION

The present invention is directed to a method to record and analyze illumination information, such as lighting direction and diffusion level so that the information may be used by applications such as facial recognition systems. The present invention utilizes computer imaging software methods to automatically extract lighting information from digitized photographs.

The present invention relates to the use of a three-dimensional target device, having known dimensions and shape, placed within a photograph at the time of capture. The embedded target device displays different light reflection and shadow characteristics when viewed and illuminated from various angles. Use of a spherical target device provides a visual reference indicator as to direction of one or more light sources in much the same way the position of the sun may be ascertained from viewing the Earth's moon. In another embodiment, the spherical surface may be treated in such a manner to produce a finish that reveals spectral highlights to determine comparative levels of light diffusion and ambiance.

Another aspect of the present invention is a process of digitally analyzing photographic images with specialized software to determine lighting and shadow conditions such as a vertical and horizontal direction of light sources in relation to a target device, degree of light diffusion, and degree of ambient illumination.

In one aspect of the invention, the shape and height of objects in the photographs is determined by light direction and three-dimensional contours are calculated by the shape and trajectory of their shadows. According to the present invention, calibrated target devices are placed within a camera's field of vision to collect lighting information. In one embodiment, a specially coated spherical ball is suspended within the field of view of camera. The appearance of the spherical shape within an image permanently records the light conditions cast at the time of capture. In another embodiment, the use of two or more light collection spheres within the same image allows light direction to be triangulated to any point within the image. In addition, a standard "fixed" light direction reference may be used to add to the accuracy of some facial recognition software systems that employ 3D contour mapping.

BRIEF DESCRIPTION OF THE DRAWINGS

The foregoing aspects of the invention are illustrated so that the attributes and advantages may be become well understood in the accompanying drawings, wherein.

DETAILED DESCRIPTION OF THE PREFERRED EMBODIMENT

The present invention is directed to a system that automatically analyzes and records specific attributes of photographic images that may be used by other software packages such as facial recognition software. As used herein, the term "attributes" includes, but is not limited to, lighting direction, light diffusion, triangulation coordinates, camera angle, color, perspective, scale, and sizing. The term "biometric data" refers to data that is associated with measurements of an individual subject within an image that may be used to identify that individual subject.

Increased security concerns have created a need for reliable forms of facial recognition. Surveillance concerns have increased the use of cameras and image capture technologies to increase security. In the past, surveillance cameras were used to remotely deliver visual information to a live viewer for analysis. However, with the assistance of the present invention, facial recognition systems may be raised to a level of accuracy that adds an element of artificial intelligence to video surveillance. These "smart cameras" could do the work of thousands of trained security personnel at far less cost by removing the human analysis required. The facial recognition technology may replace human eyes that scan crowds for familiar faces. Facial recognition technology automates the processing of existing surveillance photography. Facial recognition software can be deployed on existing video surveillance systems.

There are various approaches developed to "fingerprint" a human face. Some systems simply measure distances between the eyes, nose and other facial features, while others attempt to compare and categorize facial features against a table of different pre-determined nose, eye, and mouth shapes. Another method of facial fingerprinting is 3D contour mapping. With this method, essentially a mathematical three-dimensional representation of a person's face is stored in a database. This form of biometric data can be efficiently queried for probable matches.

In addition, the same contour mapping technique may be used when capturing images for photo identification purposes, creating another level of verification associated with identification cards.

The present invention provides for using a target device within an image to increase the accuracy of analysis when capturing images for security, identification, and characterization.

Figure 1:
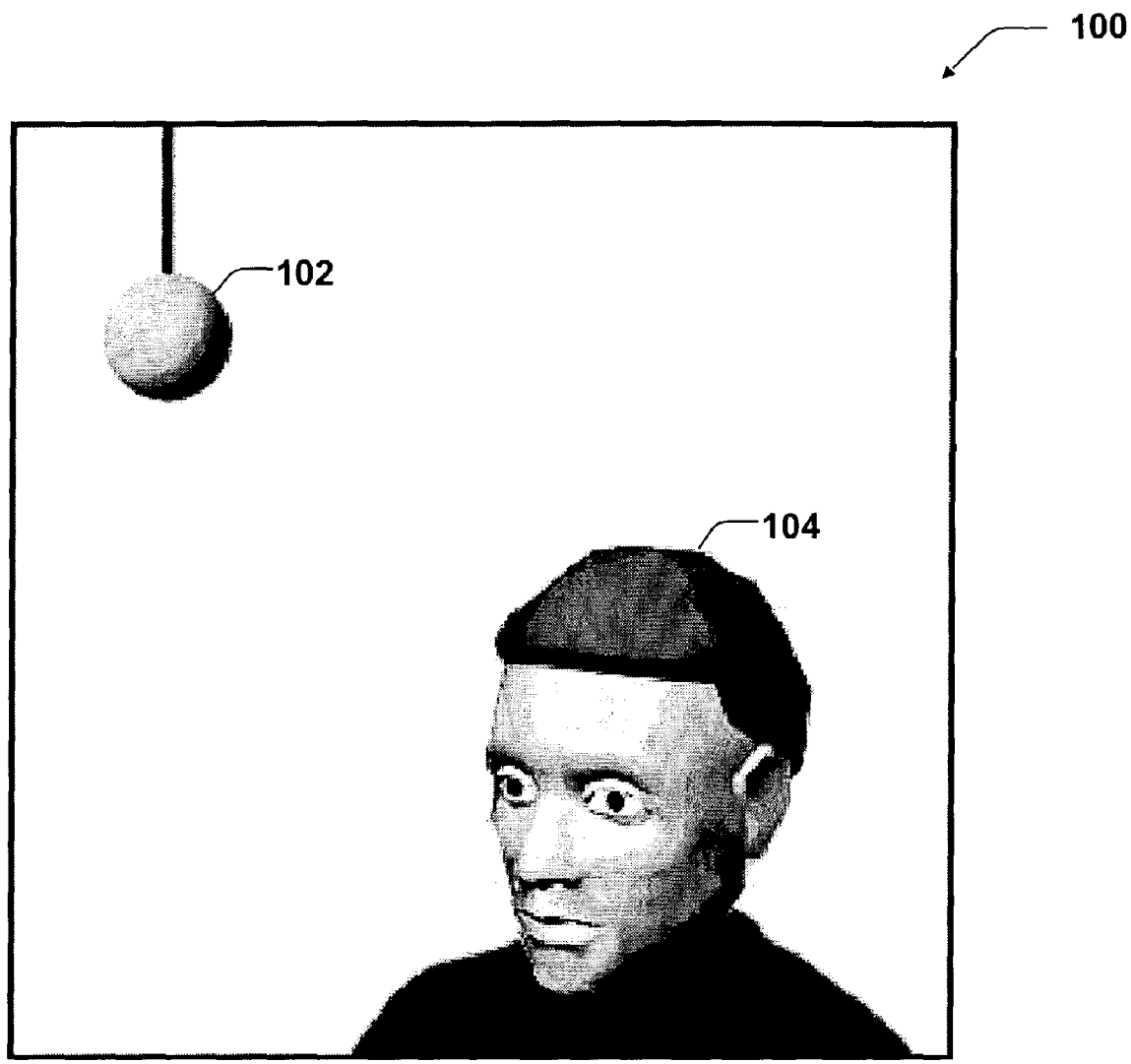
FIG. 1 illustrates an exemplary target device used within an image.

FIG. 1 illustrates an exemplary target device used within an image. The image includes the target device (102) and a subject (104). The target device (102) is shaded over a portion of its surface. The subject (104) is subjected to similar shading as the target device as they are both illuminated by the same light source. The target device is calibrated such that the attributes of the target device may be interpreted from a digitized representation of the image. By examining the attributes of the target device, the attributes applied to the subject are also known. In one embodiment, the present invention includes the use of digital imaging software and algorithms that aid in the process of locating and analyzing the embedded target device within the image. The image may be horizontally scanned by converting the image to an array of pixels to identify a luminescence value emanating from the target device (102). The location of the target device (102) may be determined by compiling the results of the scan line information into a database lookup table and recording horizontal and vertical coordinates. In addition, other methods of detecting the target device within the image may be used and may incorporate the use of such algorithms that employ particle analysis and image segmentation to locate geometric shapes.

The target device (102) may be used to determine light direction, light diffusion, light ambiance, and other attributes. Methods for determining these attributes are described in U.S. Utility patent application Ser. No. 10/188,660 filed Jul. 2, 2002 which is incorporated herein by reference. The techniques include the method of coating the target device such that light reflection from the target device may be measured.

The photograph of the subject may then be indexed, or associated with the attributes. This data may then be used to convert the image data to a form more generally used with biometric analysis. The process of conversion to biometric data is described in greater detail in the discussion of FIG. 4.

Although a simple sphere is shown in FIG. 1, many other shapes may be used for the target device. Any target device having determinable attributes is sufficient for performing the functions of the present invention.

Figure 2:
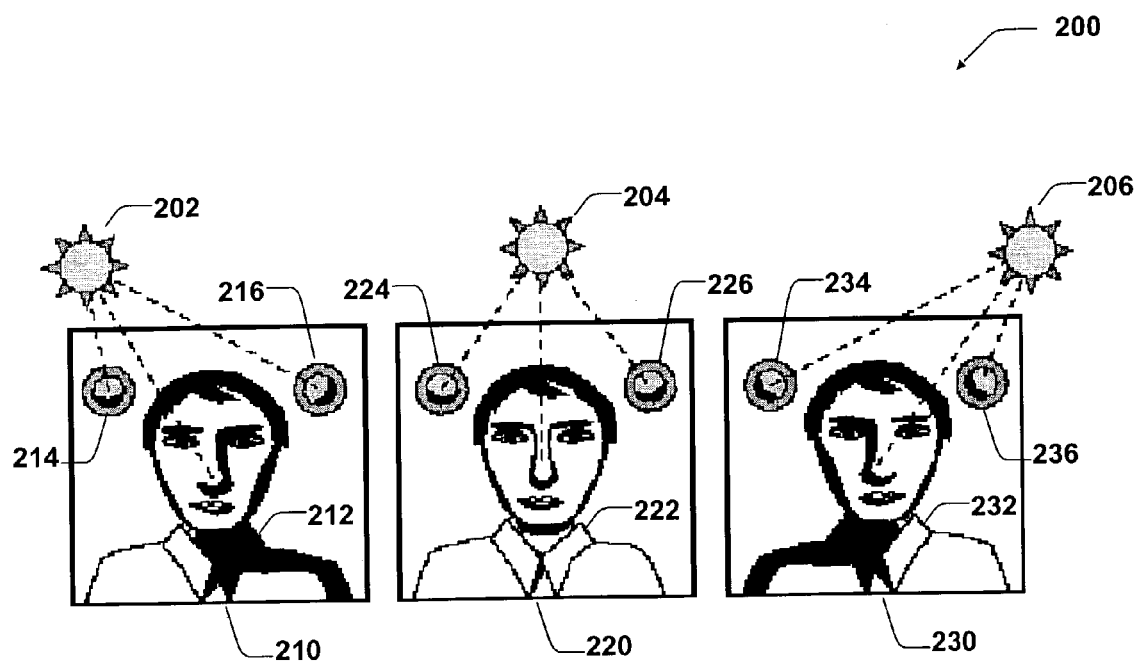
FIG. 2 illustrates the use of two exemplary target devices within an image.

FIG. 2 illustrates the use of two exemplary target devices within an image to provide triangulated light coordinates. Three images (210, 220, 230) are shown with a light source illuminating exemplary target devices and an exemplary subject from different angles. The target devices shown in the images (210, 220, 230) include a spherical central portion as well a circular ring portion. The circular ring portion may include a color coating to assist in further color analysis of the image.

The first image (210) includes target devices 214 and 216 and subject 212 illuminated by light source 202 positioned above and to the left of the subject (from the camera's perspective). The second image (220) includes target devices 224 and 226 and subject 222 illuminated by light source 204 positioned centrally above the subject. The third image (230) includes target devices 234 and 236 and subject 232 illuminated by light source 206 positioned above and to the right of the subject. The different positions of each light source (202, 204, 206) provide for different shading of the target devices and subjects in each image. For example, in the first image (210), the left target device (214) has a shaded portion that is substantially located towards the bottom the spherical center of target device 214, indicating that the light source 202 is positioned substantially above target device 214. In contrast, the right target device (216) includes a shaded portion that is substantially positioned to the lower-right of the spherical center of target device 216, indicating that the light source 202 is positioned substantially above and to the left of target device 216. As each target device is calibrated after being positioned, the position of light source 202 relative to any point on subject 212 (e.g., the tip of the subject's nose) may be triangulated from the attributes obtained by examining target devices of each image.

Although two target devices are shown in FIG. 2, multiple target devices may also be used. The additional target devices increase the accuracy of the triangulation process as more measurable points of reference are provided within the image.

Figure 3:
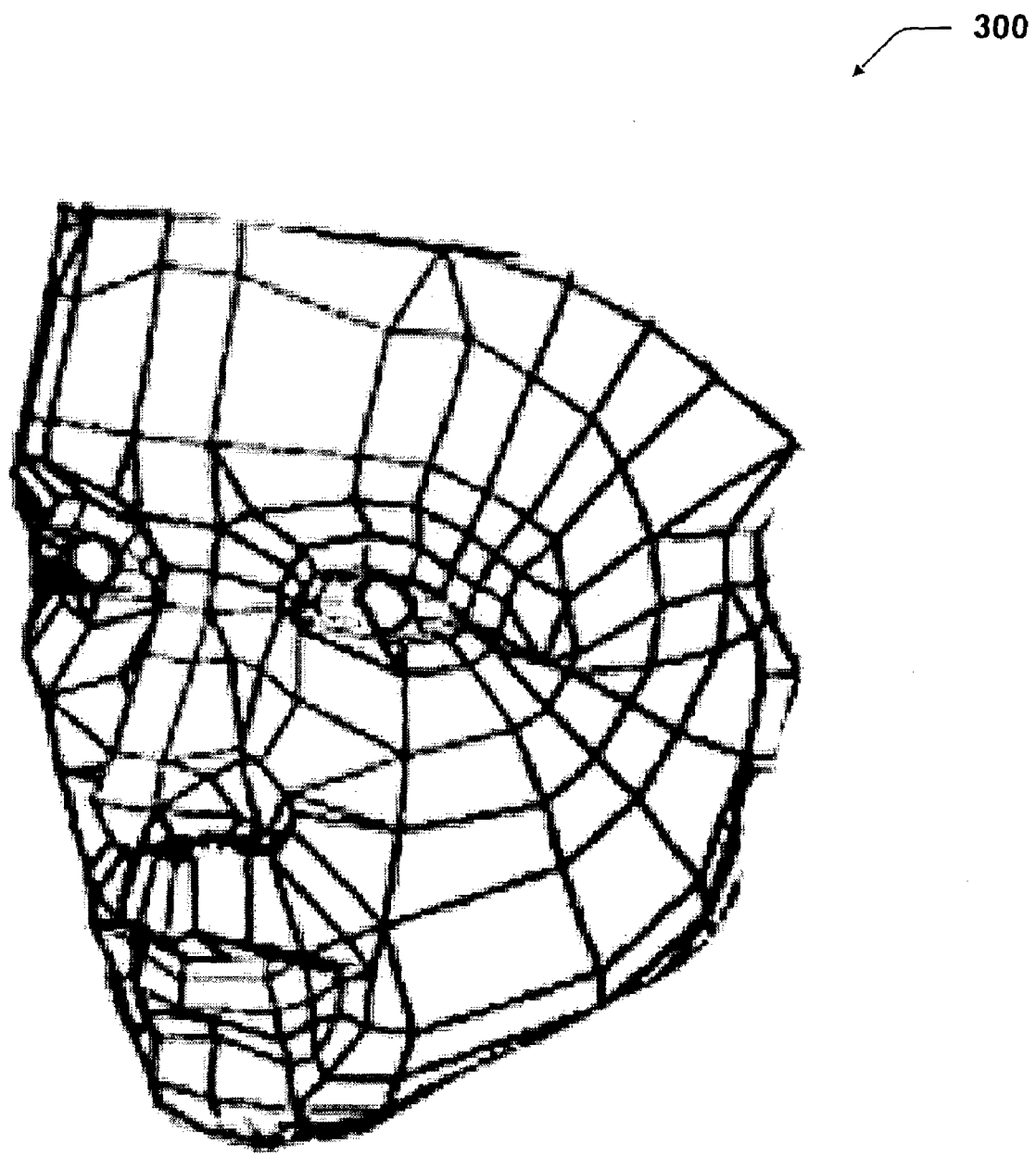
FIG. 3 illustrates an exemplary 3-D contour mapping of a human face.

FIG. 3 illustrates an exemplary 3-D contour mapping of a human face. The contour mapping (300) is generated from measurement of the illumination, or rather the shadows, associated with the object captured within an image. When the object captured within the image is a human face (as shown), the contour mapping (300) may be used to create a "facial fingerprint" that is associated with the individual of the image. The contour mapping may then be stored as a series of measurements within a database. In one example, photographs of type described could be taken of individuals of interest, as opportunities arise, and a database of high quality biometric information would result.

When further images are taken of human subjects, the contour mapping created for each image may be compared to those within the database to determine if a match exists. The attributes measured according to the present invention therefore assist in improving the facial recognition system that employ 3D contour mapping techniques.

The present invention may therefore be used in the capture of identification cards, licenses, passports, and other forms of identification. Accordingly, a facial fingerprint may be associated with the subject of each image taken by recording the attributes and generating a contour mapping of their face. In one embodiment, the data from the contour mapping (300) may be stored on the identification card itself for verification purposes, making it more difficult to tamper with the identification card. In another embodiment, the data from the contour mapping (300) may be stored in a secure database so that if an identification card is tampered with, the data associated with the contour mapping maintains its integrity.

Figure 4:
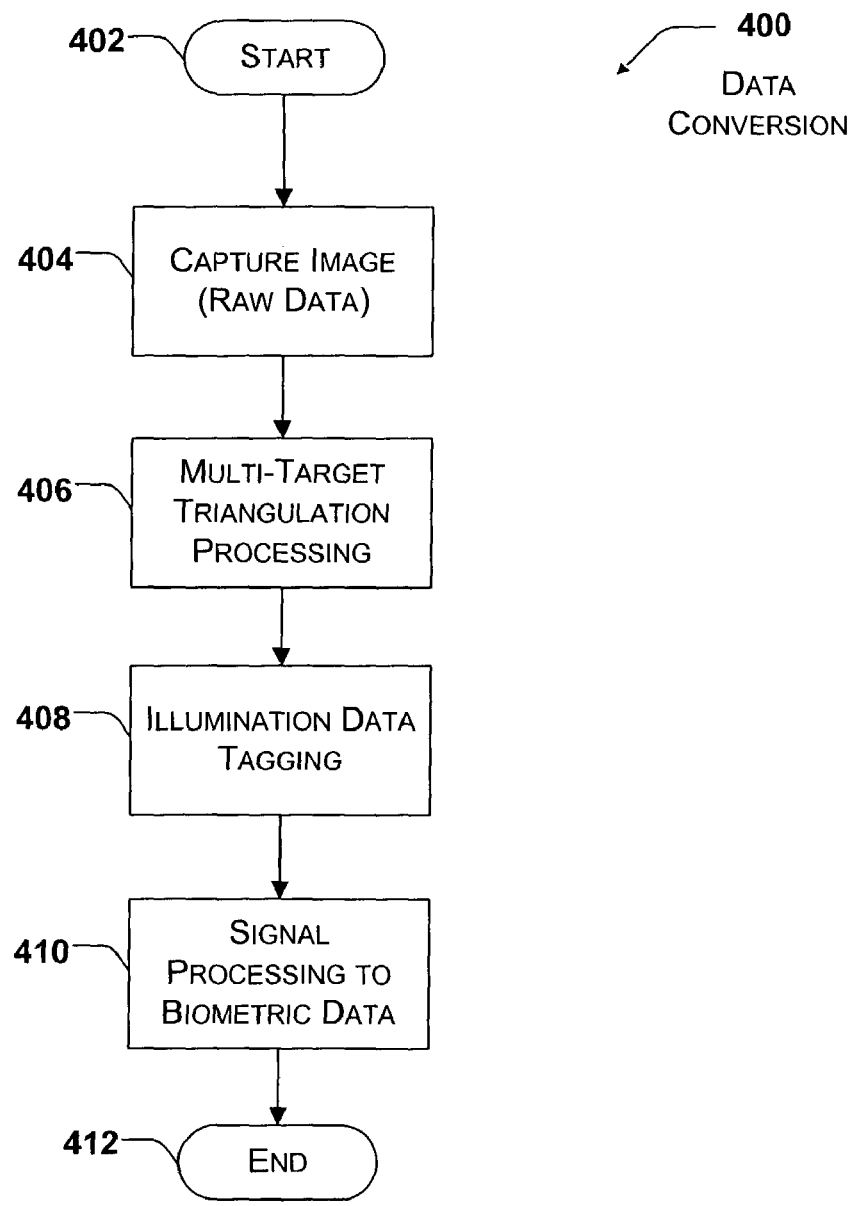
FIG. 4 illustrates a logic flow diagram of a process for converting image capture data to biometric data, in accordance with the present invention.

FIG. 4 illustrates a logic flow diagram of a process for converting image capture data to biometric data. The process (400) begins at block 402, where a camera is positioned to digitally capture an image of a subject. Processing continues at block 404.

At block 404, the image is captured with a target device included prior to the image capture and the data associated with the image is stored in a database for analysis. The target device is located within the image and the attribute data provided by the target device is associated with the image. The data of the image may be recorded on a pixel-by-pixel basis or according to some other method. The raw data from the image capture provides the scene illumination data relative to each target device located within the image. Once the data stored, processing continues at bock 406.

At block 406, any multi-target triangulation processing may be performed if multiple targets are used. The multi-target process is described in greater detail in the discussion of FIG. 2. Using the multi-target process, the position of any light sources relative to any point within the image may be determined by examining the illumination data for each target device contained within the captured image. Processing continues at block 408.

At block 408, the illumination data, including the data resulting from triangulation of the light sources for the image, are associated with the raw data representing the image. "Tagging" the image with the illumination data ensures that later examination of the image includes the illumination data processed from the image. Processing continues at block 410.

At block 410, the illumination data and raw data from the image are processed to generate data in a form that is associated with biometric measurements. In one embodiment, the illumination data is used to generate a contour mapping of the facial structure of the subject captured within the image (See FIG. 3). Accordingly, the biometric data may also then be associated with the captured image, identifying the subject within the image along with the image itself. Once the biometric data is obtained and associated with the image, processing continues at block 412 where the process (400) ends.

Although the previous discussion refers mainly to "facial recognition", the illumination data may be coordinated with any software for providing recognition of any object within an image.

While an exemplary embodiment of the invention has been described and further illustrated, it will be appreciated that various changes may be made therein without departing from the intended scope of the invention.

I claim:

1. A method using a processor on a computer device for increasing the accuracy of recognition of an object within an image, comprising:
   including a single target device that is calibrated to predetermined properties within the image prior to capturing the image; wherein the image is a digital image and wherein the target device is illuminated with a light source; wherein the target device is placed at any location within a field of vision of a camera capturing the image;
   determining lighting attributes associated with the target device directly from the digital image; wherein the lighting attributes determined comprise a light direction, a light diffusion, and a light ambiance;
   associating the lighting attributes of the target device with the object such that lighting attributes applied to the object are determined;
   generating a contour mapping of the object using light reflected from the object adjusted for lighting conditions determined from the lighting attributes of the target device; wherein the target device is located at a position that is different from a position of the object such that the contour mapping of the object is generated in response to lighting attributes associated with a different object; wherein the position of the target device and the position of the object are not coincident; and
   associating the contour mapping with the image, such that the contour mapping uniquely identifies the object within the image.

2. The method of claim 1, wherein the target device is a spherical ball that is suspended within the image, such that the shading of the spherical ball denotes the location of a light source associated with the image.

3. The method of claim 1, wherein the target device is coated such that light measurements and ambient light are measurable according to the reflection from the surface of the target device.

4. The method of claim 1, further comprising including another target device within the image prior to capturing the image.

5. The method of claim 4, further comprising determining the attributes of both target devices to triangulate light position associated with a light source with respect to a selected point within the image.

6. The method of claim 1, wherein the image is captured for the purposes of providing identification of the object within the image.

7. The method of claim 1, wherein the object is a human subject's face such that the contour mapping is a contour mapping of the human subject's face.

8. The method of claim 7, wherein the contour mapping of the subject's human face may be associated with the subject such that a facial fingerprint is provided for the human subject.

9. The method of claim 7, wherein the contour mapping may be associated with an identification card associated with the subject, wherein a mathematical representation of the contour mapping is embedded within the identification card.

10. The method of claim 7, wherein the contour mapping may be associated with an identification card associated with the subject, wherein a mathematical representation of the contour mapping is stored within a database for reference to the identification card.

11. The method of claim 1, further comprising comparing a mathematical representation of the contour mapping to mathematical representations of previously stored contour mappings to determine if the contour mapping matches a contour mapping previously stored.

12. The method of claim 1, wherein attributes associated with the target device include at least one of light direction, light diffusion, triangulation coordinates, camera angle, color, perspective, scale, and sizing.

13. A computer-readable storage medium comprising:
   a data structure including:
      data stored in an image region that includes digital information defining an image including a target device and an object; wherein the image is a digital image containing pixels; wherein the target device is placed at any location within a field of vision of a camera before capturing the image; and
      an index region that includes lighting attribute information and a contour mapping of the object, wherein the lighting attribute information describes lighting attributes of the target device in the image and the contour mapping uniquely identifies the object within the image and is generated using light reflected from the object adjusted for lighting conditions determined from the lighting attributes of the target device; wherein the target device is different from the object such that the contour mapping of the object is generated in response to lighting attributes associated with a different object; and instructions that when executed by a processor store the contour mapping of the object.

14. The computer-readable storage medium of claim 13, further comprising digital information stored in the image region that represents another target device within the image.

15. The computer-readable storage medium of claim 14, wherein the index region further comprises a triangulated light position measurement with respect to a selected point within the image, wherein the triangulated light position measurement corresponds to attribute information for both target devices within the image.

16. The computer-readable storage medium of claim 13, wherein the contour mapping may be associated with an identification card associated with the subject, wherein a mathematical representation of the contour mapping is one of stored within a database for reference to the identification card and embedded within the identification card.

17. The computer-readable storage medium of claim 13, further comprising comparing a mathematical representation of the contour mapping to mathematical representations of previously stored contour mappings to determine if the contour mapping matches a contour mapping previously stored.

18. The computer-readable storage medium of claim 1, wherein the attribute information stored within the index region include at least one of light direction, light diffusion, triangulation coordinates, camera angle, color, perspective, scale, and sizing.

19. A system for increasing the accuracy of recognition of an object within an image, comprising:

means for determining lighting attributes associated with a single target device that is calibrated to predetermined properties and included within the image prior to capturing the image; wherein the image is a digital image and the target device is illuminated by a light source; wherein the lighting attributes are determined directly from the digital image;

means for associating the lighting attributes of the target device with the object;

means for generating a contour mapping of the object according using light reflected from the object adjusted for lighting conditions determined from the lighting attributes of the target device; wherein the target device is different from the object such that the contour mapping of the object is generated in response to lighting attributes associated with a different object; and means for associating the contour mapping with the image, such that the contour mapping uniquely identifies the object within the image.

20. The system of claim 19, further comprising another target device within the image prior to capturing the image such that the attributes of both target devices allow a light direction associated with a selected point within the image to be triangulated.

* * * * *